United States Patent Office 3,838,060
Patented Sept. 24, 1974

3,838,060
MAGNESIUM ALUMINATE GALLATE PHOSPHOR
Edward E. Kaduk, Lyndhurst, Ohio, assignor to
General Electric Company
Continuation-in-part of abandoned application Ser. No. 194,449, Nov. 1, 1971. This application Sept. 18, 1972, Ser. No. 290,166
Int. Cl. C09k 1/36, 1/68
U.S. Cl. 252—301.4 P  4 Claims

ABSTRACT OF THE DISCLOSURE

Magnesium aluminate gallate phosphors activated by manganese are prepared containing a minor addition of stabilizer ion to avoid brightness loss when the phosphor is heated in the air. The stabilizer addition also permits major substitution of Al for Ga along with increased manganese activator content resulting in higher powder brightness at room temperature, greater ultraviolet absorption, and a desirable shift in spectral peak of emission response along with the better resistance to oxidation when heated in air. The phosphor is particularly useful in low pressure mercury lamps for reprographic applications.

BACKGROUND OF THE INVENTION

This invention relates to luminescent materials and more particularly green-emitting magnesium aluminate gallate phosphors activated by manganese. This application is a continuation-in-part of my copending application entitled, "Magnesium Aluminate Gallate Phosphor," Ser. No. 194,449, and filed Nov. 1, 1971, now abandoned.

Magnesium gallate activated by manganese emits in the green is described in U.S. Pat. 3,407,325 to J. J. Brown, Jr., as particularly suitable for fluorescent lamps intended for reprographic applications such as xerographic copying machines. W. L. Wanmaker et al., in an article appearing in "Philips Research Reports," 22, 304–308, June 1967, modified the formulation suggested by Brown in substituting a small amount of aluminum for gallium

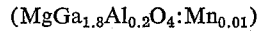

(MgGa$_{1.8}$Al$_{0.2}$O$_4$:Mn$_{0.01}$)

and observed a shift in the excitation band to shorter wave lengths and a rise in the quenching temperature.

In U.S. Pat. 3,499,843 to J. J. Brown, Jr. et al., cathodoluminescent magnesium aluminate gallate phosphors are proposed having the spinel crystal structure and coming under the general formula Mg$_x$Al$_{2y}$Ga$_{2(1-y)}$O$_{3+x+z}$:Mn$_z$, wherein $x$ is between 0.25 and 1.10, $y$ is between 0.0005 and 0.79, and $z$ is between 0.0001 and 0.1. In the foregoing, $y$ is the atom fraction of Al substituted for Ga, and this notation will be used herein; it is more descriptive of the actual substitution process of Al$_2$O$_3$ for Ga$_2$O$_3$ than the notation used by Brown wherein $y$ denotes 2 times the atom fraction. Brown et al. described their phosphor as suitable for the green component in color cathode ray or television tubes utilizing discrete phosphor elements for the three (3) primary colors of red, green, and blue, but do not suggest the possibility of using the phosphor in electric lamps.

Aluminum being much cheaper than gallium, it is economically advantageous to substitute the former for the latter. According to the prior art, when small amounts of aluminum are substituted for gallium, the phosphor has greater chemical stability and resistance to oxidation at high temperatures. However, when $y$ is increased above 0.2 in compositions activated with 0.01 Mn$^{+2}$ ion, brightness of the phosphor decreases rapidly. Thus, the advantages from substitution of aluminum for gallium in magnesium aluminate gallate phosphors up to now have been minimal and limited to a low proportion of Al substitution.

Finally, it has been customary in the preparation of thse phosphors to employ firing temperatures as high as 1400° C. in order to derive an acceptable brightness level for the emission response. Such elevated firing temperatures necessitate the use of costly preparation containers such as platinum and often result in a phosphor material so hard and coarse that specialized additional treatment becomes necessary to prepare the final product.

Phosphors prepared as described in the prior art have given an acceptable performance when incorporated in the lamps intended for reprographic use. However, the requirements for this application have become even more stringent and thus further improvements are both necessary and desirable. The modifications which are described below permit attainment of these aims.

SUMMARY OF THE INVENTION

Characteristics desirable in a phosphor intended for electrical lamps are high brightness and resistance to oxidation at the high temperatures that are encountered in lamp manufacture. High temperatures are encountered at lehring when the lamp envelope is heated to about 550° C. in air in order to decompose and drive out the binder used to apply the phosphor, and also its sealing in exhaust of the lamp envelope. The phosphor should be able to withstand such heating without loss of brightness or other desirable characteristics. I have discovered that a startling improvement in the desirable characteristics of magnesium aluminate gallate manganese-activated phosphors is achieved by adding a minor proportion of a stabilizer ion producing substance to the phosphor ingredients prior to firing with said stabilizer ion being selected from the group consisting of an alkaline earth metal ion, a phosphate ion, and combinations of an alkaline earth metal ion with a phosphate ion. One class of stabilizer ion which avoids brightness loss when the phosphor is heated in the air and permits lower firing temperatures in the phosphor preparation is the PO$_4^{-3}$ ion which can be obtained from various additives, such as (NH$_4$)$_2$HPO$_4$ and MgNH$_4$PO$_4$. A second class of stabilizer ion is the alkaline earth metals, especially the Ca$^{+2}$ ion which also can be obtained from various additives such as CaSO$_4$. An especially preferred third class of the stabilizer is the combination of an alkaline earth metal ion with phosphate ion which can be obtained with such additives as CaHPO$_4$ a cool white halophosphor, SrHPO$_4$, and BaHPO$_4$. When the PO$_4^{-3}$ ion is the ion or is used in combination with calcium ion, especially at concentrations containing .05 mole calcium ion per mole of the magnesium aluminate-gallate then still other benefits are obtained which are summarized in the following paragraphs below:

(1) The 1400° C. two-step firing temperatures conventionally employed in the phosphor preparation can be reduced significantly to approximately 1250° C. without experiencing significant reduction in the powder brightness. The lowering of the firing temperatures will prolong furnace and phosphor container life as well as permit the substitution of lower cost container materials such as quartz or Vycor trays in place of platinum vessels. Additionally, the air firing at these lower temperatures enables more effective control of the phosphor particle size which is desirable for use in reprographic lamps.

(2) The spectral peak of emission response for the present phosphors can be shifted toward the blue end of the spectrum without experiencing brightness loss. This proves to be an advantage for high speed xerographic reproduction since the process is more sensitive in the blue region. The effect is especially useful to offset a color shift from 505 nanometers to 512 nanometers in emission peak which otherwise occurs with increasing Al substitution in the phosphor. The brightness of emission response can also be improved by increasing the $Mn^{+2}$ activator level when a $CaHPO_4$ additive is employed in accordance with practice of the present invention.

(3) Particularly useful phosphor compositions of the present invention contain higher proportions of aluminum substitution for gallium wherein $y=0.3$ and higher (0.3 atom fraction Al substituted for Ga) and further contain at least 0.03 mole $Mn^{+2}$ per mole magnesium aluminate-gallate and greater. The higher Al substitution without accompanying brightness loss is advantageous from a cost standpoint, especially when considered in conjunction with lower firing temperatures which are also thereby possible.

A still further advantage derived by practice of the present invention is greater permissible variation in the phosphor composition with respect to other constituents in the composition such as the $Mg^{+2}$ ion content for preparation of high brightness phosphors in a wider range of phosphor particle size than is otherwise obtainable. In this regard it has been found that whereas Ca doping of a phosphor composition containing a manganese concentration of 0.03 mole $Mn^{+2}$ ion per mole magnesium aluminate-gallate with 0.3 atom fraction of Al being substituted for Ga should be kept below .05 mole $Ca^{+2}$ ion per mole magnesium aluminate-gallate to improve the phosphor powder brightness, it is now possible to extend the additive range without a significant decrease in brightness to a wider concentration limit between about $7.5 \times 10^{-2}$ and $2.1 \times 10^{-1}$ mole of phosphate ion per mole magnesium aluminate-gallate when the phosphate ion is used as the only stabilizer ion or is used in combination with an alkaline earth metal ion. It was also found that for the especially preferred additives which contain both phosphate ion and $Ca^{+2}$ ion there can be a mole ratio of alkaline earth metal ion to phosphate ion between approximately 1–1.6.

DRAWINGS AND DETAILED DESCRIPTION

Figure 1:
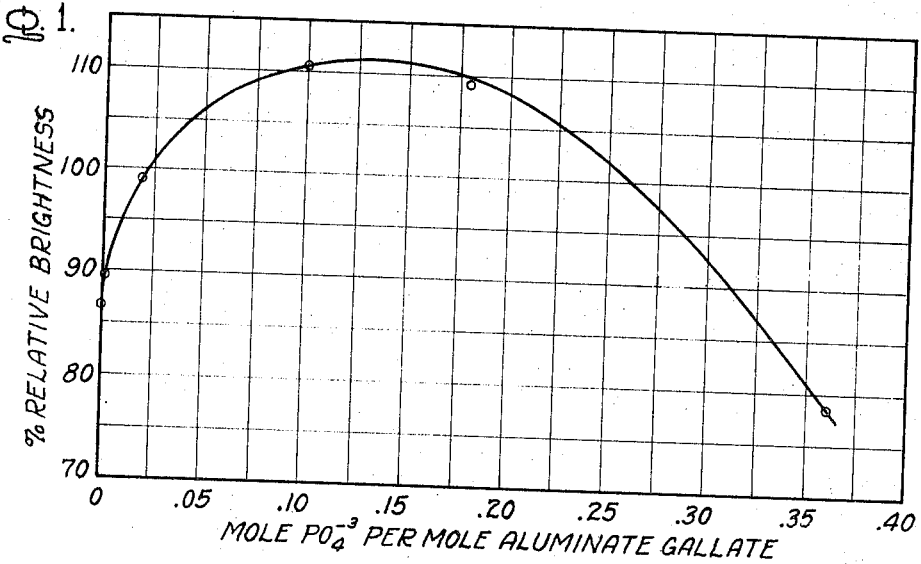
FIG. 1 is a graph showing the variation in powder brightness with phosphate ion concentration in a phosphor according to the present invention.

Tables 1–12 present the results of tests on magnesium aluminate gallate phosphors.

TABLE NO. 1

Powder Brightness of Mg Aluminate-Gallate

| Test | | Y | Original phosphor | | Oxidation resistance test (7.5 min. at 550° C.) | | Percent loss | Emission peak, nm. |
|---|---|---|---|---|---|---|---|---|
| | | | Percent brightness | Percent U.V. abs. | Percent brightness | Percent U.V. abs. | | |
| | | | .01 mole Mn/mg$(Ga,Al)_2O_4$ | | | | | |
| A | $MgGa_{1.8}Al_{0.2}O_4$ | 0.1 | 100.0 | 81.5 | 89.7 | 81.9 | 10.3 | 505 |
| B | $MgGa_{1.7}Al_{0.3}O_4$ | 0.15 | 102.5 | 79.8 | 93.8 | 79.2 | 8.7 | 505 |
| C | $MgGa_{1.4}Al_{0.6}O_4$ | 0.3 | 94.1 | 69.5 | 90.4 | 69.5 | 3.7 | 507 |
| D | $MgGa_{1.0}Al_{1.0}O_4$ | 0.5 | 62.5 | 43.5 | 61.7 | 45.0 | 0.8 | 512 |
| | | | .03 mole Mn/mg$(Ga,Al)_2O_4$ | | | | | |
| E | $MgGa_{1.4}Al_{0.6}O_4$ | 0.3 | 107.3 | 85.5 | 98.4 | 84.3 | 8.9 | 512 |
| | | | .08 mole Mn/mg$(Ga,Al)_2O_4$ | | | | | |
| F | $MgGa_{0.6}Al_{1.4}O_4$ | 0.7 | 38.2 | 49.0 | 33.7 | 50.0 | 4.5 | 522 |

TABLE NO. 2

Powder Brightness of Mg Aluminate-Gallate with Calcium Halophosphate Addition
(All air firings at 1,400° C.)

.03 mole Mn/MgGa$_{1.4}$Al$_{.6}$O$_4$ (y=0.3)

| Mole CaO per mole aluminate-gallate | Original phosphor | | Oxidation resistance test (7.5 min. at 550° C.) | | Percent loss | Emission peak, nm. |
|---|---|---|---|---|---|---|
| | Percent brightness | Percent U.V. abs. | Percent brightness | Percent U.V. abs. | | |
| None | 107.3 | 85.5 | 98.4 | 84.3 | 8.9 | 512 |
| $3 \times 10^{-3}$ | 107.8 | 86.5 | 103.0 | 86.5 | 4.8 | 510 |
| $1 \times 10^{-3}$ | 112.0 | 91.5 | 108.7 | 91.5 | 3.3 | 510 |
| $5 \times 10^{-3}$ | 115.0 | 90.0 | 112.5 | 90.1 | 2.5 | 511 |
| $2 \times 10^{-2}$ | 117.0 | 91.7 | 114.5 | 91.5 | 2.5 | 511 |
| $1.35 \times 10^{-1}$ | 101.0 | 93.9 | 99.7 | 94.2 | 1.3 | 513 |

TABLE NO. 3
Powder Brightness of Mg Aluminate-Gallate
.03 mole Mn/MgGa$_{1.4}$Al$_{0.6}$O$_4$ (y=0.3)

| Mole M*O per mole aluminate-gallate | Original phosphor | | Oxidation resistance test (7.5 min. at 550° C.) | | Percent loss | Emission peak, nm. |
|---|---|---|---|---|---|---|
| | Percent brightness | Percent U.V. abs. | Percent brightness | Percent U.V. abs. | | |
| With Calcium Carbonate Addition | | | | | | |
| 4×10⁻³ | 115.5 | 93.1 | 114.5 | 93.3 | 1.0 | 511 |
| 8×10⁻² | 112.0 | 93.1 | 109.5 | 92.3 | 2.5 | 511 |
| With Calcium Acid Phosphate Addition | | | | | | |
| 1.9×10⁻² | 117.0 | 92.0 | 115.5 | 92.4 | 1.5 | 511 |
| 6.7×10⁻² | 118.5 | 92.4 | 116.0 | 92.4 | 2.5 | 511 |
| With Strontium Acid Phosphate Addition | | | | | | |
| Mole SrO 1.9×10⁻² | 112.0 | 86.7 | 103.5 | 87.0 | 8.5 | 511 |
| With Barium Acid Phosphate Addition | | | | | | |
| Mole BaO 1.9×10⁻² | 109.5 | 83.5 | 101.0 | 83.5 | 8.5 | 511 |

*M stands for Ca, Sr, or Ba.

TABLE NO. 4
Powder Brightness of Mg Aluminate-Gallate with Calcium Addition
.04 mole Mn/MgGa$_{1.2}$Al$_{0.8}$O$_4$ (y=0.4)

| Mole CaO per mole aluminate-gallate | Original phosphor | | Oxidation resistance test (7.5 min. at 550° C.) | | Percent loss | Emission peak, nm. |
|---|---|---|---|---|---|---|
| | Percent brightness | Percent U.V. abs. | Percent brightness | Percent U.V. abs. | | |
| 5×10⁻³ (CW Halo) | 106.0 | 85.7 | 104.5 | 85.3 | 2.0 | 511 |
| 6.7×10⁻² (CaHPO$_4$) | 114.2 | 90.7 | 112.0 | 90.8 | 2.2 | 512 |

TABLE NO. 5
Z mole Mn/MgGa$_{1.0}$Al$_{1.0}$O$_4$ (y=0.5)

| Mole CaO per mole aluminate-gallate | Z | Original phosphor | | Oxidation resistance test (7.5 min. at 550° C.) | | Percent loss | Emission peak, nm. |
|---|---|---|---|---|---|---|---|
| | | Percent brightness | Percent U.V. abs. | Percent brightness | Percent U.V. abs. | | |
| None | .01 | 62.5 | 43.5 | 61.7 | 45.0 | 0.8 | 512 |
| 9.5×10⁻⁴ (CW Halo) | .03 | 89.2 | 72.7 | 86.8 | 69.2 | 2.4 | 517 |
| 1.6×10⁻³ (CW Halo) | .03 | 91.3 | 71.3 | 87.2 | 70.2 | 4.1 | 515 |
| 5.0×10⁻³ (CW Halo) | .03 | 95.5 | 70.3 | 95.0 | 70.3 | 0.5 | 513 |
| 6.7×10⁻² (CaHPO$_4$) | .04 | 110.5 | 81.8 | 109.5 | 82.5 | 1.0 | 513 |
| With SrHPO Addition | | | | | | | |
| 6.7×10⁻² (SrHPO$_4$) | .04 | 100.2 | 75.4 | 97.0 | 75.0 | 3.2 | 514 |

TABLE NO. 6
Effect of Calcium Addition on Mg Aluminate-Gallate Having Very High Manganese Content
Z mole Mn/MgGa$_{0.6}$Al$_{1.4}$O$_4$ (y=0.7)

| Mole CaO per mole aluminate-gallate | Z | Original phosphor | | Oxidation resistance test (7.5 min. at 550° C.) | | Percent loss | Emission peak, nm. |
|---|---|---|---|---|---|---|---|
| | | Percent brightness | Percent U.V. abs. | Percent brightness | Percent U.V. abs. | | |
| None | .08 | 38.3 | 49.0 | 33.7 | 50.0 | 4.6 | 522 |
| 6.7×10⁻² (CaHPO$_4$) | .08 | 62.5 | 59.0 | 57.8 | 61.0 | 4.7 | 522 |
| 6.7×10⁻² (CaHPO$_4$) | .12 | 32.5 | 67.2 | 29.6 | 66.7 | 2.9 | 523 |

TABLE NO. 7
Effect of Variation of Magnesium in Mg Aluminate-Gallate with Calcium Addition
Mg$_x$Ga$_{1.4}$Al$_{0.6}$O$_{3+x}$:Mn$_{.03}$,Ca$_{.02}$ (y=0.3)

| x | Original phosphor | | Oxidation resistance test (7.5 min. at 550° C.) | | Percent loss | Spectral peak, nm. |
|---|---|---|---|---|---|---|
| | Percent brightness | Percent U.V. abs. | Percent brightness | Percent U.V. abs. | | |
| 1.10 | 22.5 | 91.1 | 22.0 | 91.7 | 0.5 | 515–516 |
| .85 | 117.0 | 91.7 | 114.5 | 91.5 | 2.5 | 511 |
| .70 | 115.0 | 88.5 | 107.5 | 89.6 | 7.5 | 510 |
| .42 | 109.0 | 90.1 | 98.5 | 89.9 | 10.5 | 510 |

NOTE: x=Moles Mg/mole (Ga,Al)$_2$O$_3$.

TABLE NO. 8
Powder Brightness of Mg Aluminate-Gallate With Various Additives .03 mole Mn/MgGa$_{1.4}$Al$_{0.6}$O$_4$ (y=0.3):Mw=mole additive

| | | Original phosphor | | Oxidation resistance test (7.5 min. at 550° C.) | | | |
|---|---|---|---|---|---|---|---|
| Air firing temp., ° C. | Mw | Percent brightness | Percent U.V. abs. | Percent brightness | Percent U.V. abs. | Percent loss | Emission peak, nm. |
| (A) 1,400 | None | 107.5 | 85.5 | 98.5 | 84.5 | 9.0 | 512 |
| (B) 1,250 | None | 86.5 | 72.5 | 79.5 | 72.5 | 7.0 | 511 |
| Mw=CaHPO$_4$ | | | | | | | |
| (C) 1,250 | .18 | 112.0 | 87.0 | 108.5 | 87.5 | 3.5 | 508 |
| Mw=(NH$_4$)$_2$HPO$_4$ | | | | | | | |
| (D) 1,250 | .18 | 109.0 | 85.0 | 104.0 | 85.0 | 5.0 | 509 |
| Mw=MgNH$_4$PO$_4$ | | | | | | | |
| (E) 1,250 | .18 | 111.0 | 87.0 | 102.5 | 85.0 | 8.5 | 508 |
| Mw=CaCO$_3$ | | | | | | | |
| (F) 1,250 | .18 | 63.5 | 83.5 | 60.0 | 84.5 | 3.5 | 515 |
| Mw=CaSO$_4$ | | | | | | | |
| (G) 1,250 | .18 | 63.5 | 85.0 | 61.0 | 84.5 | 2.5 | 513 |

TABLE NO. 9
Powder Brightness of Mg Aluminate-Gallate With (NH$_4$)$_2$HPO$_4$ Additive .03 mole Mn/Mg$_{.85}$Ga$_{1.4}$Al$_{0.6}$O$_{3.85}$(y=0.3):Mw=mole PO$_4$/(GaAl)$_2$O$_3$ (All air firings at 1,250° C.)

| | | Original phosphor | | Oxidation resistance test (7.5 min. at 550° C.) | | | |
|---|---|---|---|---|---|---|---|
| | Mw | Percent brightness | Percent U.V. abs. | Percent brightness | Percent U.V. abs. | Percent loss | Emission peak, nm. |
| (A) | None | 86.5 | 72.5 | 79.5 | 72.5 | 7.0 | 511 |
| (B) | 1.8×10$^{-3}$ | 89.5 | 76.0 | 83.5 | 75.2 | 6.0 | 511 |
| (C) | 1.8×10$^{-2}$ | 98.5 | 81.4 | 97.3 | 82.5 | 1.2 | 510 |
| (D) | 1.0×10$^{-1}$ | 110.5 | 85.5 | 109.5 | 86.0 | 1.0 | 510 |
| (E) | 1.8×10$^{-1}$ | 109.0 | 85.0 | 104.2 | 85.0 | 4.8 | 509 |
| (F) | 3.6×10$^{-1}$ | 78.5 | 78.5 | 79.7 | 78.4 | (a) | 509 | a Gain +1.2.

TABLE NO. 10
Powder Brightness of Mg Aluminate-Gallate with MgNH$_4$PO$_4$ Additive .03 mole Mn/Mg$_x$Ga$_{1.4}$Al$_{0.6}$O$_{3+x}$:Mw=None (y=0.3)

(All air firings at 1,250° C.)

| | | Original phosphor | | Oxidation resistance test (7.5 min. at 550° C.) | | | |
|---|---|---|---|---|---|---|---|
| | x | Percent brightness | Percent U.V. Abs. | Percent brightness | Percent U.V. abs. | Percent Loss | Emission peak, nm. |
| (A) | .85 | 86.5 | 72.5 | 79.5 | 72.5 | 7.0 | 511 |
| .03 mole Mn/Mg$_x$Ga$_{1.4}$Al$_{0.6}$:Mw=.18 Mole MgNH$_4$PO$_4$/(GaAl)$_2$O$_3$ | | | | | | | |
| (B) | .75 | 104.5 | 87.0 | 99.0 | 85.5 | 5.5 | 509–510 |
| (C) | .85 | 111.0 | 85.0 | 102.5 | 85.0 | 8.5 | 508 |
| (D) | .90 | 111.5 | 86.5 | 108.0 | 86.5 | 3.5 | 509 |
| (E) | 1.00 | 111.5 | 84.5 | 109.0 | 85.5 | 2.5 | 509 |
| (F) | 1.10 | 100.5 | 84.5 | 109.5 | 85.0 | 1.5 | 509–510 |
| (G) | 1.20 | 92.0 | 81.5 | 89.0 | 81.0 | 3.0 | 511 |
| (H) | 1.30 | 12.5 | 77.4 | | | | |
| .03 mole Mn/MgGa$_{1.4}$Al$_{0.6}$:O$_4$:Mw=.28 mole mgNH$_4$PO$_4$/(GaAl)$_2$O$_3$ | | | | | | | |
| (I) | 1.03 | 106.0 | 80.0 | 102.0 | 81.5 | 4.0 | 508 |

TABLE NO. 11
Powder Brightness of Mg Aluminate-Gallate With Cool White Halo Additive .03 mole Mn/Mg$_x$Ga$_{1.4}$Al$_{0.6}$O$_{3+x}$:Mw=.02 mole Ca/(GaAl)$_2$O$_3$ (y=0.3)

(Ca/PO$_4$=1.6 for CW Halo)

[All air firings at 1,400° C.]

| | | Original phosphor | | Oxidation resistance test (7.5 min. at 550° C.) | | | |
|---|---|---|---|---|---|---|---|
| | x | Percent brightness | Percent U.V. abs. | Percent brightness | Percent U.V. abs. | Percent loss | Emission peak, nm. |
| (A) | .42 | 109.0 | 90.0 | 98.5 | 90.0 | 10.5 | 510 |
| (B) | .70 | 115.0 | 88.5 | 107.5 | 89.5 | 7.5 | 510 |
| (C) | .77 | 116.5 | 90.0 | 109.0 | 90.5 | 7.5 | 510 |
| (D) | .85 | 117.0 | 91.5 | 114.5 | 91.5 | 2.5 | 511 |
| (E) | .95 | 99.5 | 89.0 | 99.0 | 89.5 | 0.5 | 512 |
| (F) | 1.40 | 22.5 | 91.0 | 22.0 | 91.5 | 0.5 | 516 |
| .03 mole Mn/Mg$_{.85}$Ga$_{1.4}$Al$_{0.6}$O$_{3.85}$:Mw=None | | | | | | | |
| (G) | None | 107.5 | 85.5 | 98.5 | 84.5 | 9.0 | 512 |

TABLE NO. 12

Powder Brightness of Mg Aluminate-Gallate With CaHPO$_4$ Additive

.03 Mn/Mg$_x$Ga$_{1.4}$Al$_{0.6}$O$_{3+x}$(y=0.3)  Mw=mole Ca$^{+2}$PO$_4^{-3}$/(GaAl)$_2$O$_3$

| | Mw | X | Air firing T., °C. | Original phosphor Percent brightness | Original phosphor Percent U.V. abs | Oxidation resistance test (7.5 min. at 550° C.) Percent brightness | Oxidation resistance test (7.5 min. at 550° C.) Percent U.V. abs | Percent loss | Emission peak, nm. |
|---|---|---|---|---|---|---|---|---|---|
| (A) | None | .85 | 1,400 | 107.5 | 85.5 | 98.5 | 84.5 | 9.0 | 512 |
| (B) | .02 | .85 | 1,400 | 117.0 | 92.0 | 115.0 | 92.5 | 2.0 | 511–512 |
| (C) | .07 | .85 | 1,400 | 119.0 | 92.5 | 116.0 | 92.5 | 3.0 | 510–511 |
| (D) | .18 | .75 | 1,350 | 114.0 | 88.0 | 110.0 | 90.0 | 4.0 | 506 |
| (E) | .28 | .65 | 1,300 | 106.0 | 85.0 | 99.5 | 85.5 | 6.5 | 508 |

.03 Mn/Mg$_x$Ga$_{0.84}$Al$_{0.6}$O$_{3+x}$

| | Mw | X | Air firing T., °C. | Original phosphor Percent brightness | Original phosphor Percent U.V. abs | Oxidation resistance test Percent brightness | Oxidation resistance test Percent U.V. abs | Percent loss | Emission peak, nm. |
|---|---|---|---|---|---|---|---|---|---|
| (F) | .28 | .65 | 1,300 | 104.0 | 81.5 | 100.0 | 82.0 | 4.0 | 511 |

.03 Mn/Mg$_x$Ga$_{0.64}$Al$_{0.6}$O$_{3+x}$

| | Mw | X | | | | | | | |
|---|---|---|---|---|---|---|---|---|---|
| (G) | .75 | .18 | Practically dead—Faint red fluorescence | | | | | | |

According to the brightness curves shown in the Wanmaker paper, a preferred formulation wherein y=0.1 is:

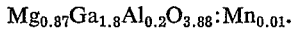

$$Mg_{0.87}Ga_{1.8}Al_{0.2}O_{3.88}:Mn_{0.01}.$$

I have used this formulation to produce a phosphor to which I have assigned a brightness value of 100%. The brightness values reported in Tables 1–12 were also obtained by using eye-sensitivity filtering means with the photocell detector.

According to Wanmaker, when y=0.1, the phosphor is 6% less bright at room temperature than the unsubstituted magnesium gallate; the phosphor wherein y=0.2 is already 15% less bright, and the phosphor wherein y=0.4 is 55% less bright and thus practically useless. By means of a minor addition of an alkaline earth compound, I have greatly improved the brightness, oxidation resistance and general utility of these aluminum substituted gallate phosphors, as appears in Tables 1–6.

In Table 1, the results of tests on magnesium aluminate gallate phosphor with substitution of Al for Ga ranging from y=0.1 to 0.7 are given. These phosphors have been prepared according to prior art teachings without addition of any stabilizer ion containing material. The compositions are listed on the basis of one (1) mole Mg; however, as is well known, there is a definite loss of elemental Ga during the firing in a reducing atmosphere. For this reason, the original compounding is carried out with a lesser proportion of Mg in order that the fired product will conform more closely to the formula indicated.

It is apparent that the brightness of the phosphor decreases as the aluminum substitution is increased to y=0.3, 0.5, 0.7. Whereas the original phosphor brightness is 100% for test A wherein the Al for Ga substitution is y=0.1, the brightness drops to 62.5% in test D wherein the Al substitution is 0.5, and to 38.2% in test F wherein the Al substitution is 0.7. The ultraviolet absorption of the phosphor drops from 81.5% in test A to 43.5 % in test D.

Considering now the brightness after the standard oxidation resistance test which consists in holding the phosphor at 550° C. for 7.5 minutes in air, test A shows a drop in brightness from 100.0% to 89.7% for an oxidation loss of 10.3%, whereas test D shows a drop in brightness from 62.5% to 61.7 for a loss of 0.8%. Tests C and E show that increasing the manganese concentration increases brightness but at the same time reduce oxidation resistance. Also part of the increase in brightness is due to the shift in the emission peak wavelength, the light being greener. The oxidation loss after heating in air is less with the higher aluminum substitution but the overall brightness is much lower. Thus the table shows that while higher aluminum substitution does improve oxidation resistance, it also entails lower brightness, so much lower in fact that the phosphor is no longer useful. Higher manganese content improves brightness but reduces oxidation resistance and shifts the emission peak towards the green.

In Table 2, the results of tests on magnesium aluminate-gallate having 0.3 substitution of Al for Ga, 0.03 mole Mn activation, and addition of a stabilizer material in the form of calcium halophosphate in the stated proportions starting at 0 and going up to 1.35×10$^{-1}$ mole of CaO per mole of magnesium aluminate-gallate are given. The additive consists of the well-known phosphor commonly used in cool white fluorescent lamps. The remarkable improvements produced by adding both calcium ion and phosphate ion to the phosphor according to my invention are apparent. In summary they are:

(1) Higher powder brightness at room temperatures, 117% compared with a phosphor having Al substitution of y=0.1 and 0.01 moles Mn per mole magnesium aluminate-gallate such as sample A in Table 1.

(2) Greater ultraviolet absorption, up to 94% compared with 78.82% for the phosphor having Al substitution of y=0.1.

(3) Better oxidation resistance upon heating in air. The standard test of 7.5 minutes at 550° C. shows a loss in brightness of 1% to 3% for the better samples, compared with a loss ranging from 10% to 15% typical of magnesium aluminate-gallate phosphors with Al substitution of y=0.1 prior to the invention.

These desirable improvements in brightness and resistance to oxidation achieved by adding both calcium ion and phosphate ion to the magnesium aluminate-gallate phosphor having Al substitution of y=0.3 and 0.03 mole manganese activation have been obtained without significantly altering the spectral distribution or the position of the emission peak.

In Table 3, the results of using other stabilizer additives according to the present invention are given. At the same approximate additive level the improvements in brightness and resistance to oxidation were best for CaHPO$_4$ and the calcium halophosphate compared with a stabilizer additive containing Ca$^{+2}$ ion as the only stabilizer additive or phosphate ion with a different alkaline earth metal.

Table 4 shows that the especially preferred additives are still effective at a substitution of Al for Ga of y=0.4 and at a manganese content of 0.04 mole Mn$^{+2}$ per mole magnesium aluminate-gallate. The brightness after the oxidation test is 106% to 114% and the oxidation loss in brightness is less than 3%.

Table 5 illustrates the relative effectiveness of the preferred additives at progressively higher manganese contents ranging from 0.01 to 0.04 mole Mn$^{+2}$ per mole magnesium aluminate-gallate even at 50% substitution of Al for Ga (y=0.05). The relative performance for SrHPO$_4$ addition is also shown.

Table 6 shows that even with a substitution of Al for Ga of y=0.7, and very high Mn$^{+2}$ content, that stabilizers containing both calcium and phosphate ions are effective to increase brightness and oxidation resistance.

Table 7 shows the beneficial effects of calcium addition over a wide range of magnesium variation. I have found that the alkaline earth addition is useful over a range of magnesium extending from about 0.1 to about 1.2 mole Mg per mole aluminate gallate.

The date in Table 8 shows that of the various additives therein listed at 0.18 mole concentration only those containing the phosphate ion as the only stabilizer additive or in conjunction with an alkaline earth ion exhibited higher brightness as compared with the same basic phosphor containing no additive at firing temperature of 1250° C. and 1400° C. At the 0.18 mole concentration and 1250° C. firing temperature, the CaCO₃ and CaSO₄ additives exhibited lower powder brightness but reference to Table 3 indicates that lower concentrations of CaCO₃ additive and a 1400° C. firing temperature provides effective $Ca^{+2}$ ion stabilization.

In Table 9 are reported the results obtained with $(NH_4)_2HPO_4$ doping which are also plotted graphically in FIG. 1 to establish the concentration limits for the phosphate additives. It will be evident from these results that improved brightness phosphors can be prepared at a 1250° C. firing temperature if the phosphate ion concentration lies between $7.5 \times 10^{-2}$–$2.1 \times 10^{-1}$ mole phosphate ion per mole magnesium aluminate-gallate.

In Table 10 there are reported the results obtained with $PO_4^{-3}$ ion doping; obtained by adding $MgNH_4PO_4$ at the indicated proportions to the same basic phosphor composition prior to firing. The $x$ value in said table represents the total Mg obtained from the $MgCO_3$ and $MgNH_4PO_4$ constituents used in the phosphor preparation. Table II reports the comparable results obtained with variation of the $Mg^{+2}$ ion concentration ranging from .42–1.4 moles Mg per mole magnesium aluminate-gallate when .02 moles $Ca^{+2}$ ion per mole magnesium aluminate-gallate is added as a cool white halophosphor. The brightness measurements reported in both tables are plotted in FIG. 3 to establish that useful magnesium aluminate-gallate phosphors of the present invention are obtained between the limits of $1 \times 10^{-1}$–1.3 mole $Mg^{+2}$ ion per mole magnesium aluminate-gallate with the present additives.

Table 12 provides additional preparations of

$Mg_xGa_{1.4}Al_{0.6}O_{3+x}$:.03Mn phosphor wherein $x$ varies between .18 and .85 and further containing various minor amounts of the $CaHPO_4$ additive. It can be seen from this table that a shift in the emission peak response of the phosphor from 512 nanometers to 506 nanometers takes place with increasing additive concentration within the limits hereinbefore set forth. A reference to the emission peak response results in Table 1 which indicate the extent of color shift attributable to increasing Al substitution in the phosphor serves to illustrate the manner in which an increase of the additive concentration can offset the emission peak shift otherwise obtained.

In accordance with my invention, I add a minor proportion of the stabilizer additive to magnesium aluminate-gallate phosphor activated by manganese sufficient to maintain brightness at least equal to that occurring with lower substitution of Al for Ga. In general, the useful range of a stabilizer additive M extends from a small but effective amount, that is $1 \times 10^{-5}$ mole per mole of magnesium aluminate-gallate to about $3 \times 10^{-1}$ mole per mole magnesium aluminate-gallate. The upper concentration limit of additive can surprisingly exceed that amount forming a solid solution in the host phosphor matrix at the indicated firing temperatures. The useful additive range is further illustrated in the accompanying FIGS. 1–3 which plot the effect upon brightness for phosphate ion as the only stabilizer ion and combinations of phosphate ion with either $Ca^{+2}$ ion or $Mg^{+2}$ ion. More particularly, the range of phosphate ion is plotted in FIG. 1 for various additions of $(NH_4)_2 HPO_4$ in a

Figure 2:
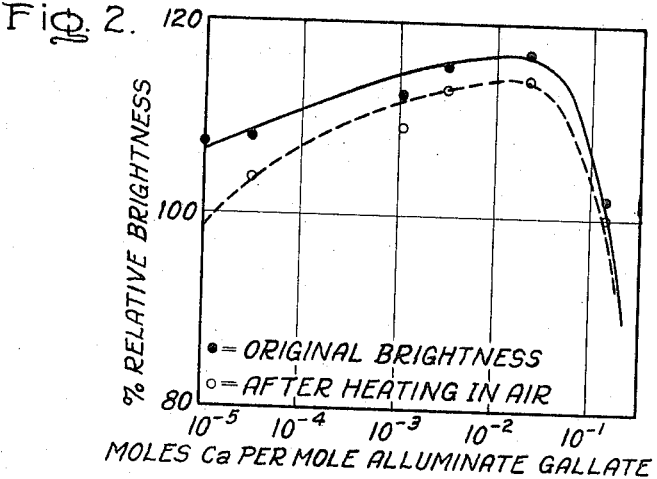
FIG. 2 is a graph showing the variation in powder brightness with calcium ion concentration for the otherwise same phosphor composition reported in FIG. 1 and which further shows the degree of oxidation resistance provided by the $Ca^{+2}$ ion additive.
Figure 3:
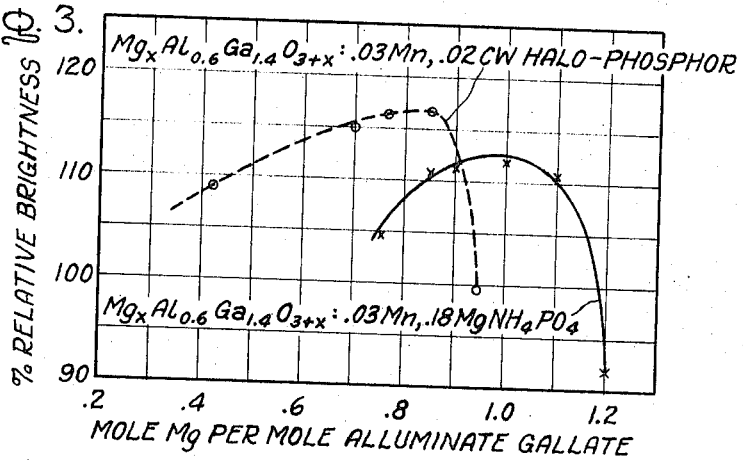
FIG. 3 is a graph showing the variation in powder brightness with magnesium ion concentration in a phosphor of the present invention and which further depicts the variation obtained with the firing temperatures employed in phosphor preparation.

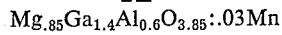
$Mg_{.85}Ga_{1.4}Al_{0.6}O_{3.85}$:.03Mn phosphor prepared by air firing at 1250° C. In FIG. 2 there is plotted the brightness results for various ranges of CW calcium halophosphate phosphor additive to the same phosphor composition employed in FIG. 1. In FIG. 3 there is shown the effect upon brightness of the $Mg^{+2}$ ion concentration with the dashed line plot representing an addition of .02 mole CW halophosphate phosphor to various basic phosphor compositions represented by

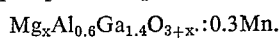
$Mg_xAl_{0.6}Ga_{1.4}O_{3+x}$:0.3Mn.

The solid line plot in FIG. 3 represents .18 mole concentration of $MgNH_4PO_4$ in the same basic phosphor composition. From a consideration of all these results taken together, it can be seen that a combination of the phosphate ion with $Ca^{+2}$ ion is the most preferred additive to stabilize a magnesium aluminate-gallate phosphor from brightness loss when the phosphor is heated in the air after preparation. It can also be noted from these results that high brightness phosphors are obtained if the $Mg^{+2}$ ion concentration of the phosphor lies between the rather wide limits of $1 \times 10^{-1}$–1.2 mole Mg per mole magnesium aluminate-gallate when the phosphate ion or a combined $Ca^{+2}$–$PO_4^{-3}$ ion additive is used. With reference to the following general phosphor formula:

$$Mg_xAl_{2y}Ga_{2(1-y)}O_{3+x+z+w}:Mn_z, M_w$$

The invention is useful at least within the limits of $x$ between about 0.1 to 1.2, $y$ between about 0.1 and 0.7, $z$ between about .01 and 0.1, and $w$ between about $1 \times 10^{-5}$ and $3 \times 10^{-1}$.

METHOD OF PREPARATION

By way of example, a phosphor according to the invention wherein $y=0.3$ may be prepared using the following phosphor ingredients:

| | Weight, gm. |
|---|---|
| $Ga_2O_3$ | 39.50 |
| $MgCO_3(MgO=42.5\%)$ | 24.24 |
| $Al_2O_3 \cdot 3H_2O$ | 14.04 |
| $MnCO_3$ | 1.11 |
| CW halophosphor | 0.15 |

Molar formula of ingredients before firing:

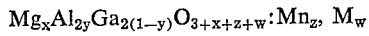
$Mg_{0.85}Al_{0.6}Ga_{1.4}O_{3.85}:Mn_{.03}Ca_{.005}Pa_{43 \times 10^{-3}}$ After thorough mixing, the ingredients are first fired 4 hours at 1250° C. in air to carry out most of the inherently sluggish reaction of the oxides which forms the magnesium aluminum-gallate. The diffusion of the cations is rather slow despite the high firing temperature, and I have found it desirable to remix or regrind the first fired product in a mortar or ball mill and then to fire again. The second firing is also done at 1250° C. in the air for a more extended period, suitably 16 to 18 hours. Surprisingly, even this rather extreme heat treatment does not cause the phosphor to sinter excessively, and the cooled powder can be ground and screened quite readily. A third and final firing is done at 1200° C. for 2 hours in a reducing atmosphere, suitably nitrogen containing about 0.5% hydrogen. It is during this last step that some of the gallium is lost.

In my experience, this method has consistently produced powders which are whiter when viewed in daylight and brighter when viewed under exciting ultraviolet radiation than are powders produced by the procedures described in the references mentioned earlier. On the other hand, my experience with preparations of a .03Mn⁺² activated 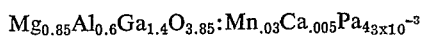 $Mg_{.85}Ga_{1.4}Al_{0.6}O_{3.85}$ phosphor containing .067 molar concentration $Ca^{+2}$–$PO_4^{-3}$ ion obtained from $CaHPO_4$ addition indicates that powder brightness varies with the air firing temperature. More particularly, a firing temperature of 1250° C. produces as good a phosphor as can be produced with a considerably higher 1400° C. firing temperature if no additive is used. In fact, the oxidation resistance for the 1250° C. air fired product was found to be significantly better than test results upon a phosphor fired at 1400° C., but containing no additive as was earlier shown.

What I claim as new and desire to secure by Letters Patent of the United States is:

1. An improved magnesium aluminate gallate phosphor activated with manganese which further contains a minor proportion of stabilizer additive $M_w$ as a solid solution in the phosphor matrix to avoid brightness loss when the phosphor is heated in air, said stabilizer additive consisting essentially of an alkaline earth metal ion selected from the group of calcium, strontium and barium with a phosphate ion, wherein the mole ratio of alkaline earth metal ion to phosphate ion is between approximately 1–1.6, said phosphor having the formulation:

$$Mg_xAl_{2y}Ga_{2(1-y)}O_{3+x+z+w}:Mn_z, M_w$$

wherein $x$ is between about 0.1 to 1.2 wherein $y$ is between about 0.1 and 0.7 wherein $z$ is between about .01 and 0.1 and $w$ is between about $1\times10^{-5}$ and $3\times10^{-1}$.

2. A phosphor as in claim 1 wherein the phosphate ion is present at a mole fraction between $7.5\times10^{-2}$ and $2.1\times10^{-1}$ mole phosphate ion per mole magnesium aluminate-gallate.

3. A phosphor as in claim 1 wherein at least 0.3 atom fraction of Al is substituted for Ga.

4. A phosphor as in claim 3 wherein the manganese concentration is at least 0.03 mole $Mn^{+2}$ per mole magnesium aluminate-gallate.

References Cited

UNITED STATES PATENTS

| 3,499,843 | 3/1970 | Brown et al. | 252—301.4 R |
| 3,632,522 | 1/1972 | McAllister | 252—301.4 R |
| 3,635,833 | 1/1972 | Datta | 252—301.4 R |
| 3,723,339 | 3/1973 | Wanmaker et al. | 252—301.4 R |

FOREIGN PATENTS

| 465,210 | 5/1950 | Canada | 252—301.4 R |

JACK COOPER, Primary Examiner

U.S. Cl. X.R.

252—301.4 R